(12) United States Patent
Wen

(10) Patent No.: US 7,654,171 B2
(45) Date of Patent: Feb. 2, 2010

(54) BRAKE HANDLE HAVING SUPPORTING FRAME

(76) Inventor: Chester Wen, 235 Chung - Ho Box 8-24, Taipei (TW)

( * ) Notice: Subject to any disclaimer, the term of this patent is extended or adjusted under 35 U.S.C. 154(b) by 236 days.

(21) Appl. No.: 11/762,076

(22) Filed: Jun. 13, 2007

(65) Prior Publication Data

US 2008/0307922 A1    Dec. 18, 2008

(51) Int. Cl.
*F16C 1/10* (2006.01)
(52) U.S. Cl. .................................. 74/502.2; 74/489
(58) Field of Classification Search ............... 74/502.2, 74/488, 489
See application file for complete search history.

(56) References Cited

U.S. PATENT DOCUMENTS 6,015,237 A * 1/2000 Ogawa ....................... 384/475

2002/0078789 A1* 6/2002 Chen .......................... 74/551.8
2003/0183038 A1* 10/2003 Cornolti et al. ............... 74/525

\* cited by examiner

*Primary Examiner*—Richard W L Ridley
*Assistant Examiner*—Terence Boes

(57) ABSTRACT

A brake handle having a supporting frame, a handle and a push unit; wherein: the supporting frame has a receiving space; a piston is installed in the receiving space; the handle has a first sliding groove; the push unit has a second sliding groove; the second sliding groove is installed with an adjusting unit; the handle and push unit are pivoted to the supporting frame; the handle and push unit are pivoted to the supporting frame; the push unit resists against the piston; the adjusting unit passes through the first sliding groove and second sliding groove so as to pivotally install the handle and the push unit; and a screw rod is screwed to the adjusting unit. The screwing operation of the screw rod with respect to the adjusting unit will adjust an elevation of the handle.

14 Claims, 6 Drawing Sheets

BRAKE HANDLE HAVING SUPPORTING FRAME

FIELD OF THE INVENTION

The present invention relates to brakes, and particularly to a brake handle having a supporting frame which has a firm structure and has a wide range for adjustment. Furthermore the force applied can be controlled effectively.

BACKGROUND OF THE INVENTION

Brakes are important for traffic safety, especially for a high speed driving. If the braking device is not good, even the driver has very good technology in driving, he (or she) can not effectively control a bicycle and thus, safety driving can not be achieved. Thus a good brake is very important in driving.

In one prior art braking pump, an oil pressure braking system has a pump. A retainer is installed to the pump. The retainer is used as a fulcrum for adjusting between a releasing position and a braking position. In braking, an actuating rod in the handle will reduce inwards so as to have a braking effect. A braking handle has a seat having a transversal assembly hole. The hole has an opening facing to the pump. A spring is assembled to the hole of the handle. A control block is also assembled to the seat. The control block has a control rod which is protruded from the opening and resists against the actuating rod. A sealing block is installed to the opening of the seat for sealing the assembly hole.

However the prior art braking device is transversally penetrated by a handle and a screw rod resisting against the pneumatic device for providing barking force by pneumatic pressures. The angle adjustable is finite. The barking handle is not in parallel to the pneumatic rod, but is tilt to the pneumatic rod. Thus, the contact therebetween is not complete. The pressure can not be transferred completely, the contact surface of the stud and pneumatic rod is easy to wear. For a long time, the whole structure will destroy. Moreover, the pressure is directly transferred to the braking pump. The oil pressure of the braking pump is controlled by the pressure from the finger. The braking is one stage, but not multiple stages. Thus, the control is inconvenient, even some accident occurs.

Thus, there is an eager demand for a novel design which is more stable and more effective.

SUMMARY OF THE INVENTION

Accordingly, the primary object of the present invention is to provide a brake handle having a supporting frame which is a firm structure and has a wide range for adjustment. Furthermore the force applied can be controlled effectively.

To achieve above objects, the present invention provides a brake handle having a supporting frame, a handle and a push unit; wherein: the supporting frame has a receiving space; a piston is installed in the receiving space; the handle has a first sliding groove; the push unit has a second sliding groove; the second sliding groove is installed with an adjusting unit; the handle and push unit are pivoted to the supporting frame; the handle and push unit are pivoted to the supporting frame; the push unit resists against the piston; the adjusting unit passes through the first sliding groove and second sliding groove so as to pivotally install the handle and the push unit; and a screw rod is screwed to the adjusting unit; a push rod installed in a through hole of the supporting frame; the push rod resisting against the push unit; the push unit is movable around the rotary shaft; when the push rod is driven to resist against the push unit, the push unit is pushed so that a push unit tightly resists against the piston; on the contrary, when the push rod screws out from the through hole of the supporting frame, no push force applied to the push unit so as to retain a predetermined distance to the piston; and thus the sensitivity in braking is adjusted. The screwing operation of the screw rod with respect to the adjusting unit, the first sliding groove and the second sliding groove will move with respect to one another s as to adjust an elevation of the handle.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
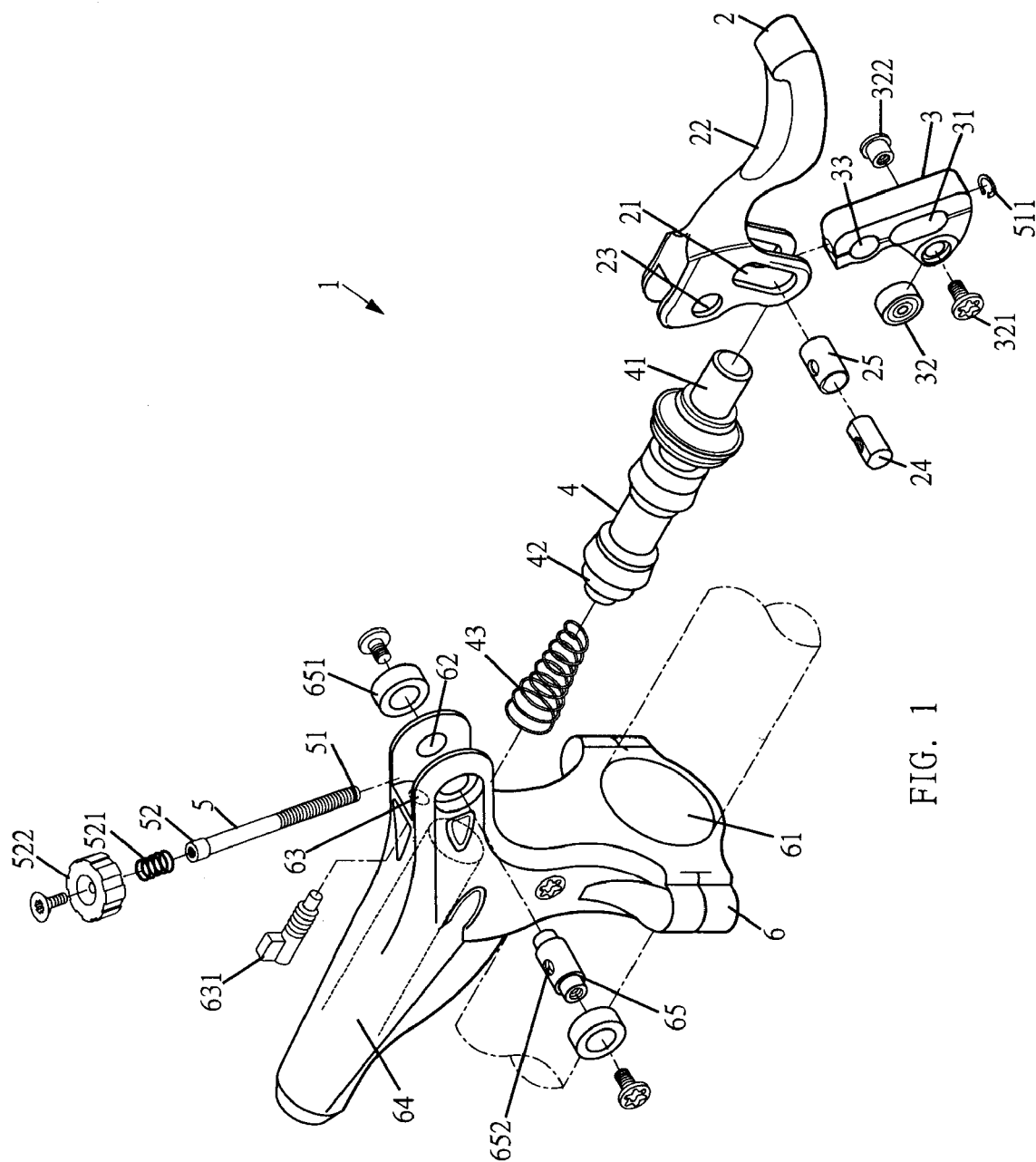
FIG. 1 is an exploded schematic view of the brake handle of the present invention.
Figure 2:
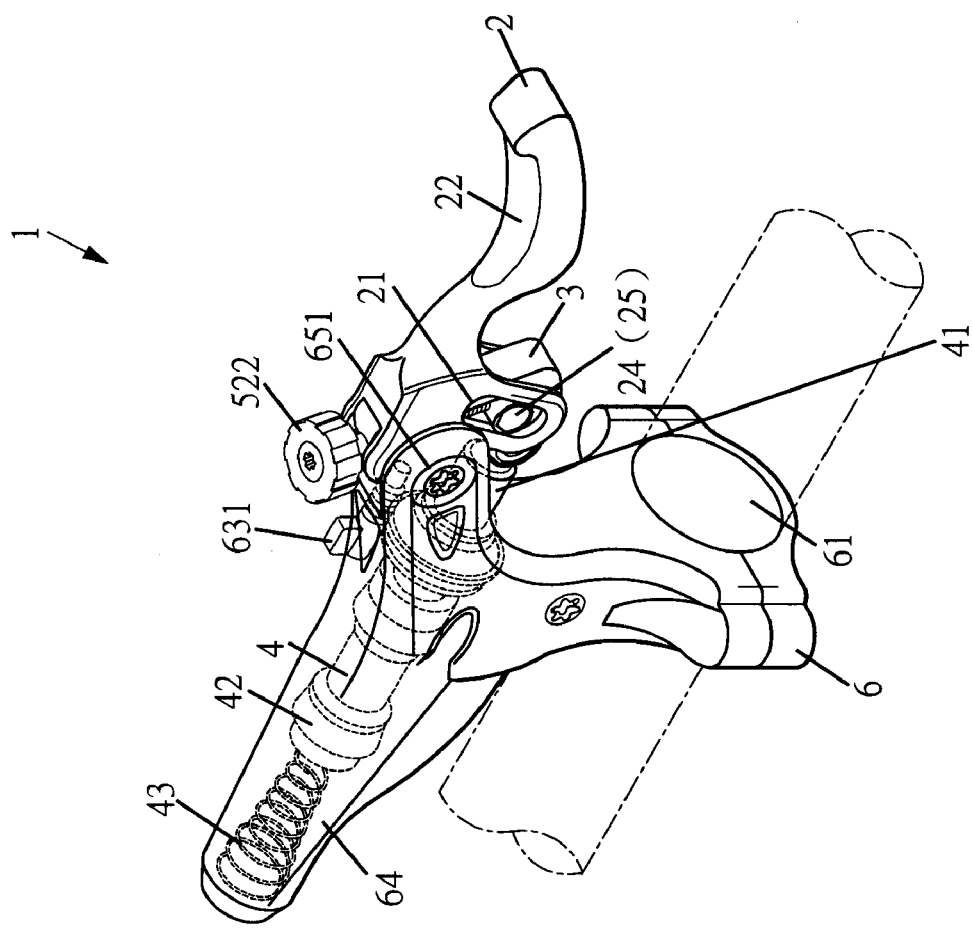
FIG. 2 is an assembled schematic view of the brake handle of the present invention.
Figure 3:
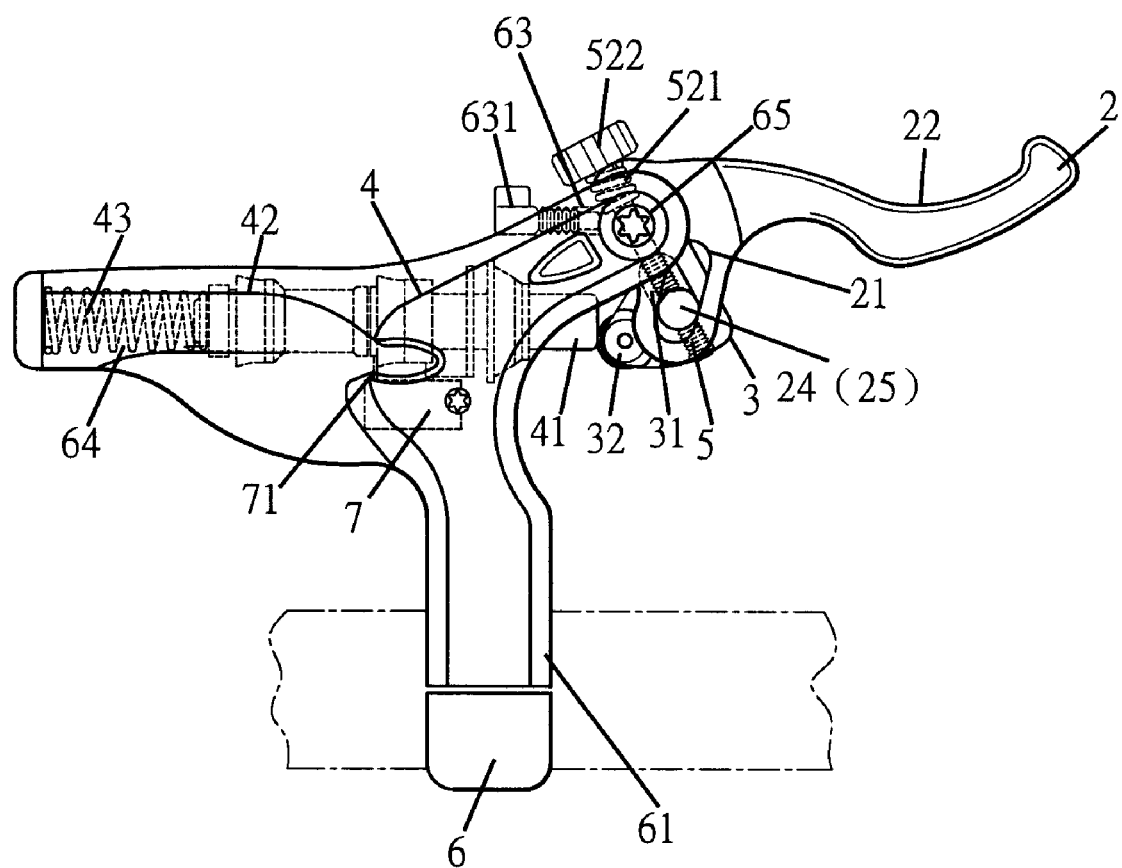
FIG. 3 is an assembled schematic cross sectional view about the brake handle of the present invention.

Referring to FIGS. 1 to 3, the brake handle 1 of the present invention is illustrated. The present invention has the following elements.

A supporting frame 6 has a mounting hole 61 for mounting the brake handle to a vehicle. The supporting frame 6 is formed with a receiving space 64. An elastic unit 43 and a piston 4 are mounted into the receiving space 64. One end of the piston 4 is a force receiving end 41 and another end of the piston 4 is a push end 42. The supporting frame 6 is formed with a through hole 63 for installing with a push rod 631. The supporting frame 6 is formed with a frame pivotal hole 62.

A handle 2 has one end installed with a holding portion 22. Another end of the handle 2 is formed with a handle pivotal hole 23 and a first sliding groove 21. The first sliding groove 21 has a long elliptical shape.

A push unit 3 is formed with a pivotal hole 33 and a second sliding groove 31. The second sliding groove 31 has a long elliptical shape. Further, the push unit 3 is pivotally installed with a push block 32 by using a male stud 321 to engage with a female stud 322.

Referring to FIG. 2, in assembly, a rotary shaft 65 passes through the handle pivotal hole 23 of the handle 2, the push pivotal hole 33 of the push unit 3 and the frame pivotal hole 62 of the supporting frame 6 for combining the handle 2, push unit 3 and supporting frame 6. Two ends of the rotary shaft 65 are fixed by studs and rings 651. The push unit 3 is installed in the handle 2 and the handle 2 is installed in the supporting frame 6. Thus, the handle 2 and push unit 3 are pivoted in the supporting frame 6. The first sliding groove 21 of the handle 2 and the second sliding groove 31 of the push unit 3 are passed by an adjusting unit 24. An adjusting cover 25 encloses the adjusting unit 24. A screw rod 5 screws through a through hole 652 of the rotary shaft 65, the push unit 3 and the adjusting unit 24. One end of the screw rod 5 is fixed as a fixing end 51 by using a fixing buckle 511 to fix the fixing end 51 to a lower end of the push unit 3. Thus the screw rod 5 is freely pivoted along a radial direction of the adjusting unit 24. The screw rod 5 is formed with threads for screwing to the threads of the adjusting unit 24. Another end of the screw rod 5 is a moving end 52. A spring 521 and a rotation unit 522 are assembled to the moving end 52.

Thus, the push unit 3 is pivoted to the handle 2 and the push unit 3 is installed in the handle 2. The adjusting unit 24 passes through the first sliding groove 21 and the second sliding groove 31. The screwing movement of the screw rod 5, the position of the adjusting unit 24 is adjusted so as to adjust the position of the handle 2. Thus the size of the brake handle 1 of the present invention is adjusted to fit the size of the user's hand.

The push rod 631 resists against the push unit 3. The push unit 3 is movable around the rotary shaft 65. When the push rod 631 is driven to resist against the push unit 3, the push unit 3 is pushed so that the push block 32 tightly resists against the piston 4. On the contrary, when the push rod 631 screws out from the through hole 63 of the supporting frame 6, no push force applied to the push unit 3 so as to retain a predetermined distance to the piston 4. Thus the sensitivity in braking is adjusted.

Figure 4:
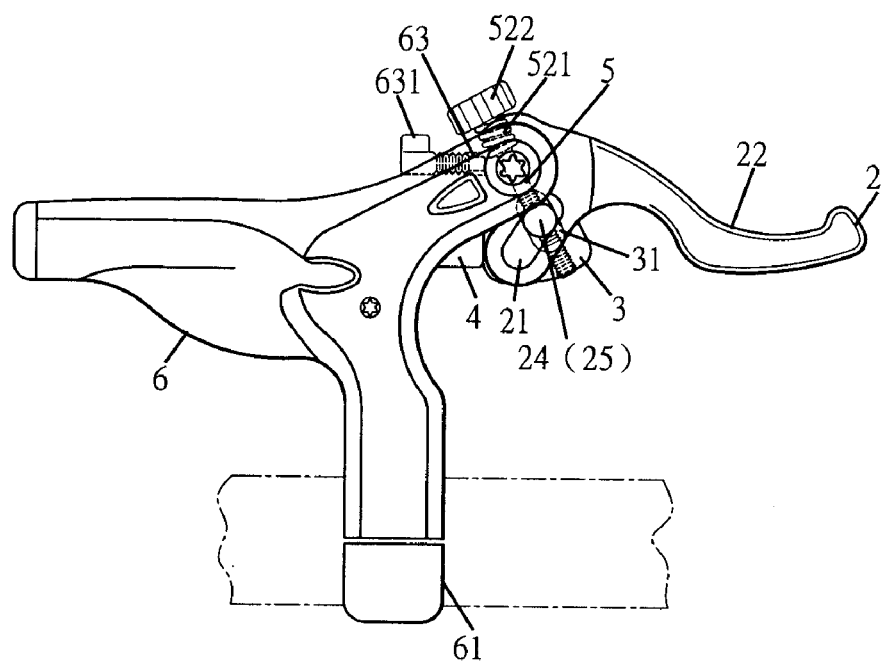
FIGS. 4 and 5 are schematic sectional views showing the operation of the present invention.
Figure 5:
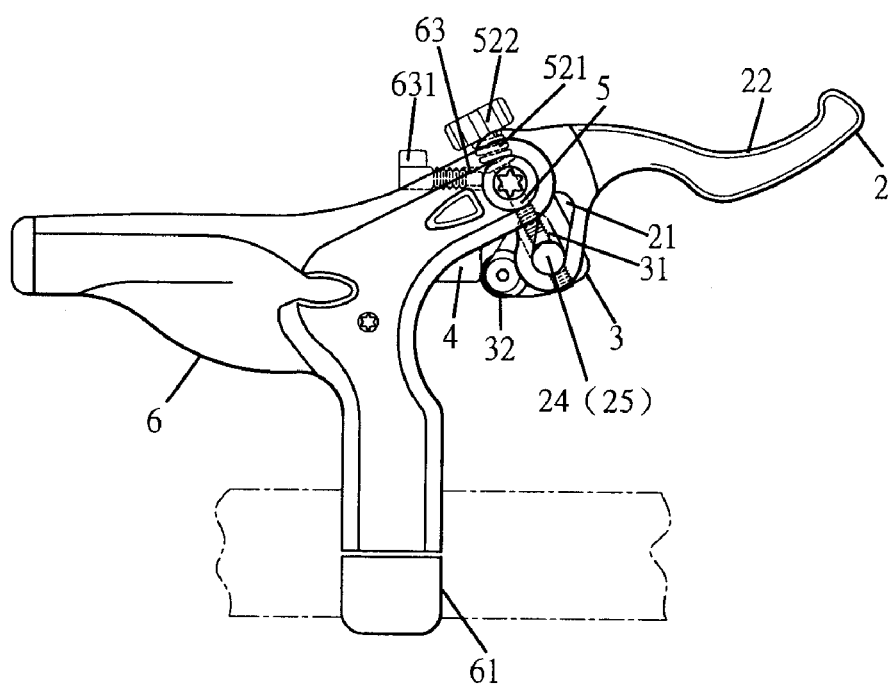

Referring to FIGS. 4 and 5, when it is desired to adjust the elevation of the handle 2, the rotation unit 522 is screwed and thus the rotation unit 522 will drive the screw rod 5 so that the adjusting unit 24 will move along the screw rod 5 and the adjusting unit 24 moves upwards and downwards along the second sliding groove 31. Moreover, the adjusting unit 24 passes through the first sliding groove 21 and second sliding groove 31. When the adjusting unit 24 moves along the second sliding groove 31, the adjusting unit 24 also resists against the first sliding groove 21 so that the first sliding groove 21 moves along the adjusting unit 24. Furthermore the handle 2 having the first sliding groove 21 is pivoted to the rotary shaft 65 of the supporting frame 6. Thus the handle 2 is driven by the adjusting unit 24 to pivot along the rotary shaft 65. As a result, the elevation of the handle 2 is adjusted.

Figure 6:
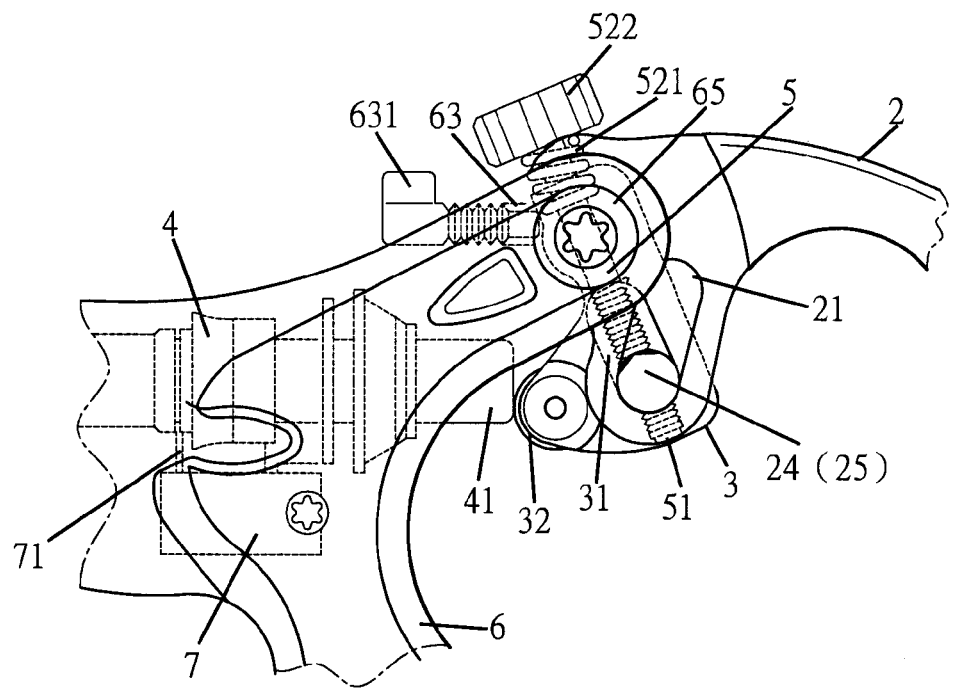
FIGS. 6 and 7 are schematic views showing the adjusting operation of the push rod of the present invention.
Figure 7:
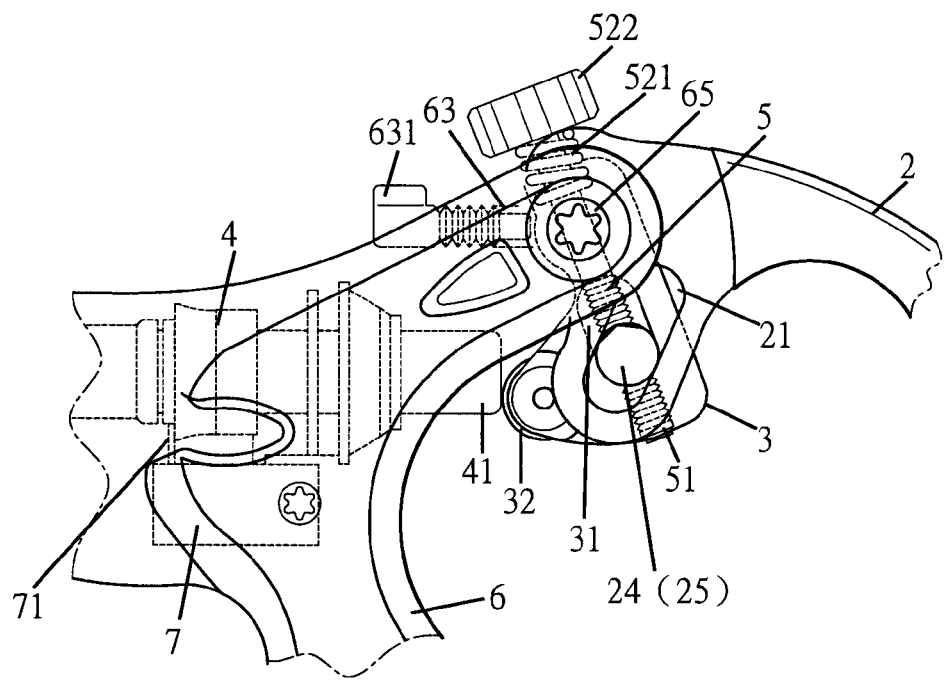

Referring to FIGS. 6 and 7, the push rod 631 is formed with threads and is screwed to the through hole 63 of the supporting frame 6. See FIG. 6, when the push rod 631 is rotated to a front side, it only slightly resists against the push unit 3. The push unit 3 is at a normal state and the push block 32 of the push unit 3 slightly resists against the piston 4. A predetermined distance is formed between the piston 4 and the oil hole 71 of an oil tank. When the handle 2 is pressed, the handle 2 will drive the push unit 3 to cause the push block 32 resists against the piston 4. Due to the distance between the piston 4 and the oil hole 71 of the oil tank 7, when the handle 2 is pressed, the piston 4 will push toward the oil hole 71 for braking. Therefore, a short time period from pressing the handle 2 to the barking action is required. Thus, the braking operation is not sensitive. Referring to FIG. 7, if the push rod 631 is moved to the backside, when the push rod 631 screws inwards to resists against the push unit 3, the push unit 3 will rotate around the rotary shaft 65 to cause the push block 32 of the push unit 3 to resist against the piston 4. The piston 4 will push forwards to flush with the oil hole 71 of the oil tank 7. When the user presses the handle 2, the piston 4 will resist against the oil hole 71 of the oil tank 7 to actuate the braking operation. The braking operation is sensitive. Thus the braking sensitivity is controlled by moving the push rod 631 to the front side or back side.

Figure 8:
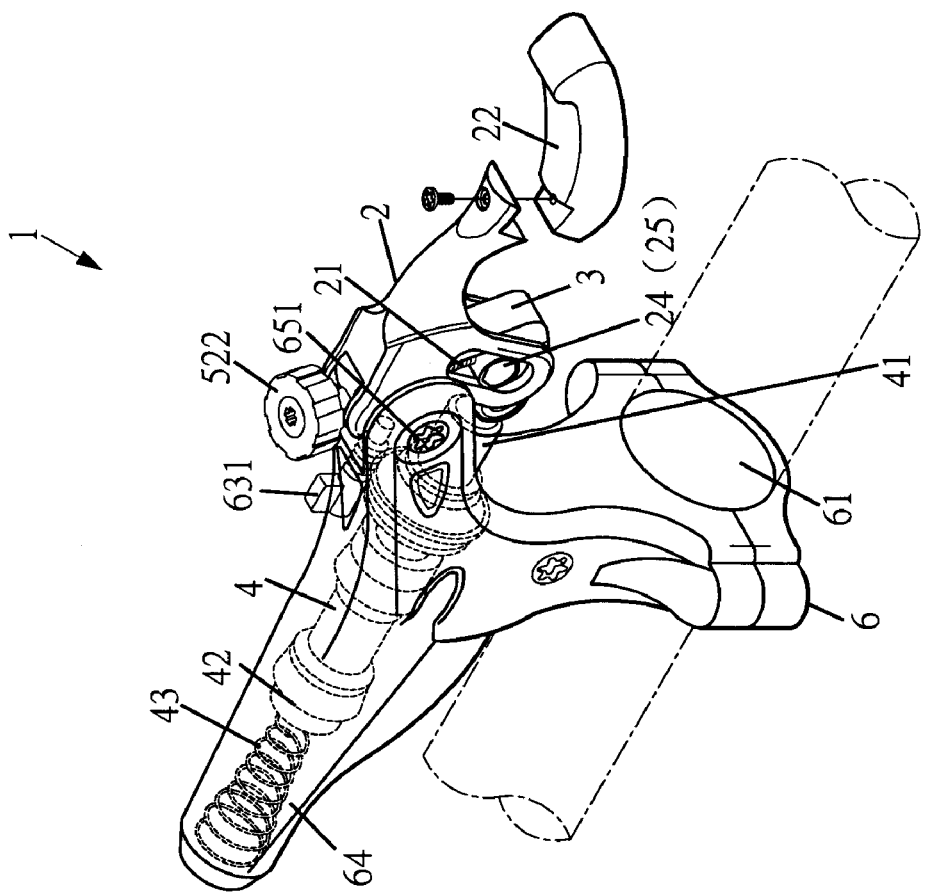
FIG. 8 is a schematic view about the second embodiment of the present invention.

Referring to FIG. 8, the second embodiment of the present invention is illustrated. In this embodiment, those identical to the above mentioned embodiment will not be further described herein. Only those difference are disclosed. In this embodiment, the holding portion 22 of the handle 2 is separable. The holding portion 22 is locked to the handle 2 by screws. It is only necessary to detach the screw for separating the holding portion 22 from the handle 2.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A brake handle comprising:
a supporting frame, the supporting frame having a receiving space defined therein for receiving a piston;
a handle pivotally connected to the supporting frame, the handle having a first sliding groove defined therein;
a push unit pivotally connected to the supporting frame, the push unit having a second sliding groove defined therein, wherein the push unit resists against the piston;
an adjusting unit movably received in the first sliding groove and the second sliding groove;
a rotary shaft passing through the supporting frame, the handle and the push unit so as to pivotally connect the handle and push unit with the supporting frame; and
a screw rod passing through the rotary shaft and screwed to the adjusting unit;
wherein when screwing the screw rod, the adjusting unit moves along the first sliding groove and the second sliding groove so as to adjust an elevation of the handle.

2. The brake handle as claimed in claim 1, wherein one end of the piston is a force receiving end which resists against the push unit; and another end of the piston is a push end which is installed with an elastic unit.

3. The brake handle as claimed in claim 1, wherein two ends of the rotary shaft are installed with rings and studs.

4. The brake handle as claimed in claim 1, wherein one end of the screw rod is a fixing end and another end of the screw rod is a moving end which is installed with a rotation unit for adjusting screwing operation of the screw rod.

5. The brake handle as claimed in claim 1, wherein the supporting frame is formed with a mounting hole for mounting the brake handle to a vehicle.

6. The brake handle as claimed in claim 1, wherein the push unit is installed with a push block for resisting against the piston.

7. The brake handle as claimed in claim 1, wherein a lower end of the screw rod is installed with a fixing buckle for pivoting the screw rod to the push unit.

8. The brake handle as claimed in claim 1, wherein the handle has a holding portion which is detachable from the handle.

9. The brake handle as claimed in claim 1, further comprising:
a push rod installed in a through hole of the supporting frame; the push rod resisting against the push unit; wherein when the push rod is driven to resist against the push unit, the push unit is pushed so that the push unit tightly resists against the piston; when the push rod screws out from the through hole of the supporting frame, no push force applied to the push unit so as to retain a predetermined distance to the piston.

10. The brake handle as claimed in claim 9, wherein one end of the piston is a force receiving end which resists against the push unit; and another end of the piston is a push end which is installed with an elastic unit.

11. The brake handle as claimed in claim 9, wherein one end of the screw rod is a fixing end and another end of the screw rod is a moving end which is installed with a rotation unit for adjusting screwing operation of the screw rod.

12. The brake handle as claimed in claim 9, wherein the supporting frame is formed with a mounting hole for mounting the brake handle to a vehicle.

13. The brake handle as claimed in claim 9, wherein the push unit is installed with a push block for resisting against the piston.

14. The brake handle as claimed in claim 9, wherein the handle has a holding portion which is detachable from the handle.

* * * * *